(12) United States Patent
Gjerpe et al.

(10) Patent No.: US 10,974,802 B2
(45) Date of Patent: Apr. 13, 2021

(54) VESSEL ENERGY MANAGEMENT SYSTEM

(71) Applicant: Siemens Aktiengesellschaft, Munich (DE)

(72) Inventors: Paul Fredrik Gjerpe, Oslo (NO); Wolfgang Voss, Oberreichenbach (DE)

(73) Assignee: Siemens Aktiengesellschaft, Munich (DE)

( * ) Notice: Subject to any disclaimer, the term of this patent is extended or adjusted under 35 U.S.C. 154(b) by 350 days.

(21) Appl. No.: 16/068,937

(22) PCT Filed: Jan. 16, 2017

(86) PCT No.: PCT/EP2017/050826
§ 371 (c)(1),
(2) Date: Jul. 10, 2018

(87) PCT Pub. No.: WO2017/125359
PCT Pub. Date: Jul. 27, 2017

(65) Prior Publication Data
US 2019/0023369 A1    Jan. 24, 2019

(30) Foreign Application Priority Data

Jan. 20, 2016  (EP) ................................. 16152131
May 4, 2016   (GB) ................................. 1607785.1

(51) Int. Cl.
*B60L 3/00*    (2019.01)
*B63H 21/21*   (2006.01)
*B63H 21/17*   (2006.01)

(52) U.S. Cl.
CPC ............... *B63H 21/21* (2013.01); *B60L 3/00* (2013.01); *B60L 3/0061* (2013.01);
(Continued)

(58) Field of Classification Search
CPC .. B63H 21/21; B63H 21/17; B63H 2021/173; B63H 2021/216; B60L 3/0061;
(Continued)

(56) References Cited

U.S. PATENT DOCUMENTS 6,307,276 B1 * 10/2001 Bader ................. B60L 15/2045
290/40 C
6,645,017 B1    11/2003 Skrzypek et al.
(Continued)

FOREIGN PATENT DOCUMENTS

CN    102396127 A    3/2012
CN    103332284 A    10/2013
(Continued)

OTHER PUBLICATIONS

International Search Report dated Mar. 24, 2017, for PCT/EP2017/050826.

*Primary Examiner* — Jonathan L Sample
*Assistant Examiner* — B M M Hannan
(74) *Attorney, Agent, or Firm* — Wolter Van Dyke Davis, pllc

(57) ABSTRACT

A vessel energy management system for controlling power supply to and from a propulsion system of a vessel. The energy management system has a motor-generator unit adapted to receive power from a prime mover of the vessel, a frequency converter, an energy storage unit, and a controller. According to different embodiments, the energy storage unit includes one or more capacitors, super capacitors or ultra capacitors. The controller determines an instantaneous power requirement of the propulsion system and an average power generated by the prime mover. A comparator compares the instantaneous required power and average power. If the instantaneous required power exceeds the average power, the motor-generator unit receives energy from the energy storage unit. If the instantaneous required
(Continued)

power is less than the average power, the motor-generator unit supplies power from the prime mover to the energy storage unit.

15 Claims, 7 Drawing Sheets

(52) U.S. Cl.
CPC ............ *B60L 3/0092* (2013.01); *B63H 21/17* (2013.01); *B60L 2200/32* (2013.01); *B60L 2220/42* (2013.01); *B63H 2021/173* (2013.01); *B63H 2021/216* (2013.01)

(58) Field of Classification Search
CPC ...... B60L 3/0092; B60L 3/00; B60L 2220/42; B60L 2200/32; Y02T 10/64; H02J 7/14; B63B 2755/00
USPC .......................................................... 701/21
See application file for complete search history.

(56) References Cited

U.S. PATENT DOCUMENTS

| | | | | |
|---|---|---|---|---|
| 2009/0156068 A1* | 6/2009 | Barrett | ................. | B60W 10/08 440/3 |
| 2009/0176417 A1* | 7/2009 | Rembach | ............... | B63H 21/20 440/6 |
| 2010/0039054 A1* | 2/2010 | Young | .................. | B60W 10/26 318/376 |
| 2010/0060076 A1 | 3/2010 | Gemin et al. | | |
| 2010/0125383 A1 | 5/2010 | Caouette | | |
| 2010/0284117 A1* | 11/2010 | Crane | .................... | B63H 21/20 361/93.1 |
| 2012/0101671 A1* | 4/2012 | Caouette | ................... | B63J 3/00 701/21 |
| 2012/0309242 A1* | 12/2012 | Haugland | ................ | H02J 3/36 440/3 |
| 2013/0293003 A1* | 11/2013 | Kanerva | ................ | B63H 23/24 307/9.1 |
| 2014/0187107 A1* | 7/2014 | Gemin | ................... | B63H 21/22 440/3 |
| 2015/0045997 A1* | 2/2015 | Nogi | ........................ | B60L 9/08 701/19 |
| 2016/0020720 A1* | 1/2016 | Green | ................... | H02P 27/047 318/807 |
| 2016/0336928 A1* | 11/2016 | Kuznetsov | ................ | H02J 3/30 |
| 2018/0364718 A1* | 12/2018 | Gundersen | ........... | G05D 1/0206 |

FOREIGN PATENT DOCUMENTS

| | | | | |
|---|---|---|---|---|
| CN | 104859828 A | 8/2015 | | |
| DE | 102011122130 A1 | 6/2013 | | |
| FR | 2999147 A1 | 6/2014 | | |
| KR | 20140046441 A | 4/2014 | | |
| WO | 2012175624 A1 | 12/2012 | | |
| WO | WO2012/175624 | * 12/2012 | ............. | B63H 21/17 |

* cited by examiner

VESSEL ENERGY MANAGEMENT SYSTEM

CROSS REFERENCE TO RELATED APPLICATIONS

This application is the US National Stage of International Application No. PCT/EP2017/050826 filed Jan. 16, 2017, and claims the benefit thereof. The International Application claims the benefit of European Application No. EP16152131 filed 20 Jan. 2016 and GB Application No. GB1607785.1 filed 4 May 2016. All of the applications are incorporated by reference herein in their entirety.

FIELD OF INVENTION

This invention relates to a vessel energy management system and method, in particular for a marine, or seagoing, vessel.

BACKGROUND OF INVENTION

Ships of all types try to reduce operating costs as much as possible in order to be competitive. The main engine operates most efficiently if it has a sufficient and substantially constant power demand, but this is difficult to achieve, other than in calm conditions. In increased sea states, the energy required to move the vessel varies between the peaks and troughs of the waves, or swell, often in a cyclical manner, similar to a sine wave. The ship needs to have sufficient power to cope with the maximum expected power requirement, but at other parts of the cycle, that power is not used.

SUMMARY OF INVENTION

In accordance with a first aspect of the present invention a vessel energy management system for controlling power supply to and from a propulsion system of a vessel comprises a motor/generator unit adapted to receive power from a prime mover of the vessel; a frequency converter; an energy storage unit and a controller; wherein the energy storage unit comprises one or more capacitors, super capacitors or ultra capacitors, chemical energy storage, such as batteries, or flywheel energy storage; wherein the controller of the energy management system determines an instantaneous power requirement of the propulsion system and average power generated by the prime mover; a comparator to compare the instantaneous required power and average power; wherein if the instantaneous required power exceeds the average power, the motor/generator unit receives energy from the energy storage unit; and, wherein if the instantaneous required power is less than the average power, the motor/generator unit supplies power from the prime mover to the energy storage unit.

Smoothing for peaks and troughs in demand allows the main engine to be operated more efficiently and reduces the wear and tear.

Advantageously, the system further comprises an input from a main switchboard of the vessel, whereby if the required power exceeds the average power, the motor/generator unit receives energy from an auxiliary generator via the main switchboard, in addition to energy from the prime mover, or energy storage unit.

If needed, additional energy can be supplied from auxiliary generators.

Advantageously, the system further comprises an input to a main switchboard of the vessel, whereby if the power requirement of the propulsion system is less than the average power, the main switchboard receives energy from the prime mover, or energy storage unit, via the energy management system.

If there is excess energy from the prime mover or energy storage unit, then this can be supplied to the main switchboard.

Advantageously, the energy storage unit further comprises a chopper to control the rate of charging and discharging of the capacitors, super capacitors or ultra capacitors, chemical energy storage, such as batteries, or flywheel energy storage.

Advantageously, the system further comprises a clutch on the shaft to disconnect the propeller if the prime mover is powering the main switchboard alone.

In accordance with a second aspect of the present invention, a method of vessel energy management for controlling power supply to and from a propulsion system of a vessel comprises receiving at a motor/generator unit power from a prime mover of the vessel; determining a power requirement of the propulsion system of the vessel; determining average power generated by the prime mover; comparing the instantaneous required power and average power; if the required power exceeds the average power, causing the motor/generator unit to receive energy from capacitors, super capacitors, or ultra capacitors, chemical energy storage, such as batteries, or flywheel energy storage of the energy storage unit; if the required power is less than the average power, causing the motor/generator unit to supply power from the prime mover to capacitors, super capacitors, or ultra capacitors, chemical energy storage, such as batteries, or flywheel energy storage of the energy storage unit; monitoring the instantaneous power required and average power in varying sea conditions and adapting accordingly.

Advantageously, the method further comprises receiving power at the motor/generator unit from an auxiliary generator via the main switchboard of the vessel, if the required power exceeds the average power.

If more energy is needed by the propulsion system than that available from the prime mover, or energy storage unit, then the energy management system can feed power from auxiliary generators connected to the main switchboard.

Advantageously, the method further comprises inputting power from the prime mover to a main switchboard of the vessel, if the required power is less than the average power.

If the energy requirement of the propulsion system is less than the power available from the prime mover, then the energy management system can feed power to the main switchboard, from one or both of the prime mover or the energy storage unit, so that the switchboard can supply its consumers.

Advantageously, the method further comprises disconnecting a propeller of the propulsion system and supplying all power from the prime mover to the main switchboard of the vessel.

BRIEF DESCRIPTION OF THE DRAWINGS

An example of a vessel energy management system in accordance with the present invention will now be described with reference to the accompanying drawings in which.

DETAILED DESCRIPTION OF INVENTION

Electric ferries are known, having onboard batteries for storing energy when connected to a shore supply when docked, so that the ferry has a clean and quiet energy source in operation. Typically, an onboard generator is also provided, as a back-up if there is a greater than expected power requirement, or for assisting in charging the batteries when the shore supply is inadequate. The battery is discharged at a reasonably constant rate, over the course of the journey, then charged up again when the ferry docks. However, for seagoing vessels, responding to wave cycle power demand which may vary by several megawatts in the space of less than one minute, using batteries to smooth out the demand is not practical, as batteries do not respond well to receiving large amounts of charge and discharging by a similar amount shortly afterwards, as is required in this application.

Figure 1:
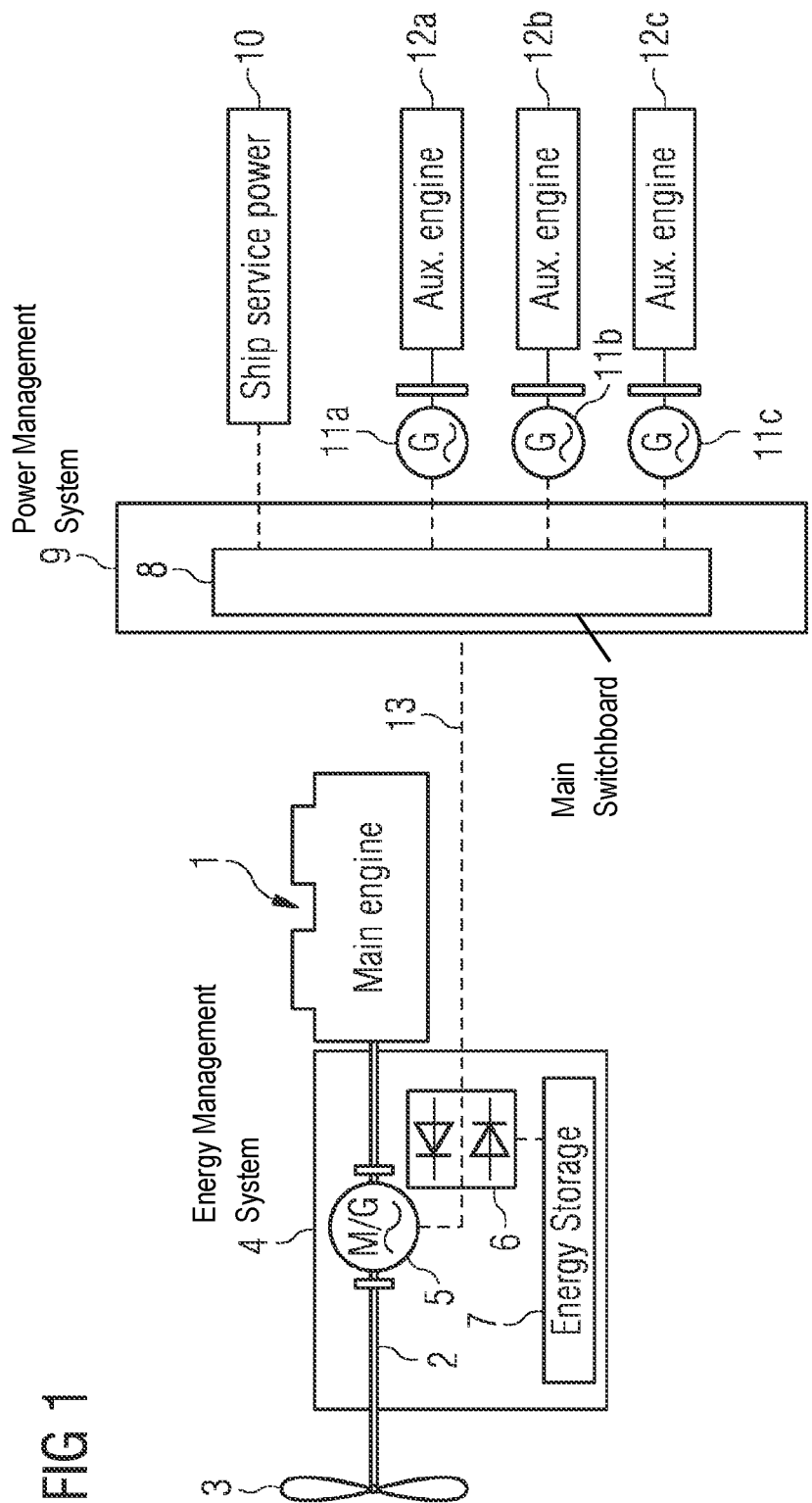
FIG. 1 is a block diagram illustrating the main power generation and consumption elements for a marine vessel having an energy management system according to the invention.

FIG. 1 is a block diagram illustrating the main power generation and consumption elements for a marine vessel having a power control system according to the invention. The main engine 1 turns a shaft 2 connected to a propeller 3. An energy management system 4, comprising the shaft 2, a motor/generator unit 5, a single unit which is able to act as either motor or generator, according to the requirement, a frequency converter 6 and an energy storage unit 7, controls the supply of power to the propeller 3 and the supply of power to consumers, via a connection 13 to main switchgear 8 of the vessel, as well as controlling power storage. The energy management system includes a controller and comparator (not shown). The main switchgear 8 provides a power management system 9 for ship service power 10 and generators 11a, 11b, 11c which are connected to auxiliary engines 12a, 12b, 12c respectively. The combined motor/generator unit 5 may be mounted to the shaft 2, or connected via gearing, or directly connected, so that energy can be given to or taken from the propulsion system. The AC voltage taken off via the motor/generator unit 5 is fed to the frequency converter 6. The frequency converter 6 includes an inverter, chopper and an active front end. The inverter and active front end can convert AC to DC and vice versa. The chopper controls the energy being fed back and forth to capacitors, batteries, or flywheel energy storage in the energy storage unit. The input frequency from the motor/generator unit 5 is typically of the order of 9 Hz AC and is converted to a desired onboard frequency, typically 50 or 60 Hz AC, then transformed by a transformer (not shown) to the correct voltage level to feed the consumers 10, or supplied to the energy storage unit 7.

In the present invention, fuel consumption on the vessels may be reduced by cycling power between the main engine 1 and the energy storage unit 7. The energy storage unit comprises capacitors, or more advantageously, supercapacitors or ultracapacitors, or may comprise chemical energy storage, such as batteries, or flywheel energy storage. The energy storage unit may have a capacity of up to 20 MWs, but below 10 MWs, and more typically 6.6 MWs may be sufficient for providing the necessary boost, or energy storage. The use of capacitors means that excess energy is stored without a chemical reaction, which would be the case with conventional battery storage, thus allowing faster charging and discharging to cope with the variation in power demand as the vessel moves through the water. The use of batteries allows significant cost reduction. Flywheels have a good lifetime and relatively low maintenance requirement.

Figure 2:
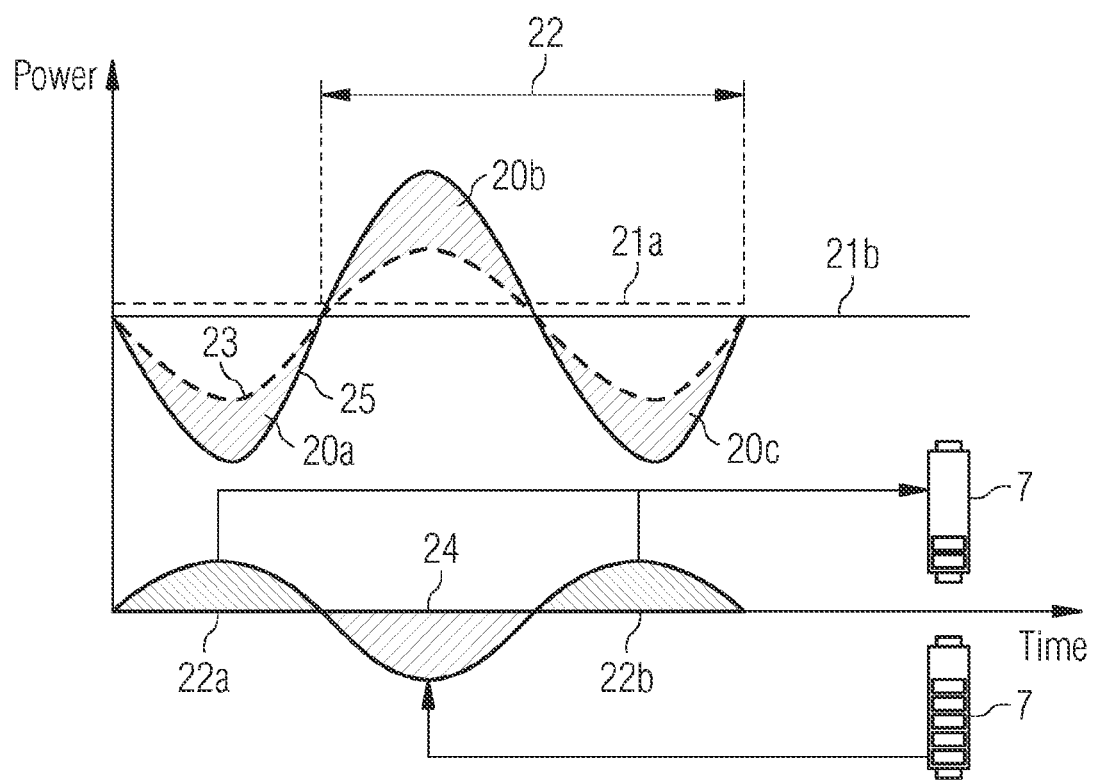
FIG. 2 is a graph of change in power demand with time for a conventional vessel and for a vessel having an energy management system according to the invention.

FIG. 2 illustrates the effect of standard operation 25 of a vessel on power demand with time and compares this with the smoothed out demand 23 achieved using a method according to the present invention. The graph of power against time indicates that for one wave period 22 in which the ship moves across one wavelength of water there is a time period within the cycle, which is less than the wave period, over which the power flow required from the main engine is less than that which is being produced and another time period, also less than the wave period, during which the power flow demanded from the main engine is greater than that being produced. The graph shows that the depth of the troughs and height of the peaks of power required from the main engine is greater without energy management 25, than with energy management 23.

Due to losses in the system, the actual average power required 21a over the cycle is typically a few percent more than the average power 21b indicted by the level where the demand changes from negative to positive and vice versa. In a well optimised system these losses may be reduced to a little less than 1%, but there will always be a small amount of loss. By applying the method of the present invention, the depth of the troughs of power required from the main engine may be reduced and the height of the peaks of power required from the main engine may be reduced. The area between the standard operation graph 25 and the smoothed out demand graph 23 using the present invention is the power which may be stored for later use 20a, 20c, or the power which may be taken back from storage to augment 20b the actual power from the main engine. The additional power 22a, 22b taken from the main engine in periods of low demand is stored in the energy storage unit 7 as illustrated in the lower section of the graph. During periods of higher demand, than supply from the main engine 1, the energy storage unit 7 gives up energy to the motor/generator unit 5 to power the propeller 3 as indicated by area 24.

The energy management system includes a wave estimator to estimate when to take power off the shaft and when to give power to the shaft. This process is typically coordinated with energy supplied from the shaft or from the auxiliary engines 12a, 12b, 12c to the main switchboard 8 and with the ship service power 10 requirement. One way of estimating the wave period and wave height is to use a Kalman filter which then provides an input to the energy management system to control the timing of power take off from the shaft, or power take on to the shaft.

Figure 3:
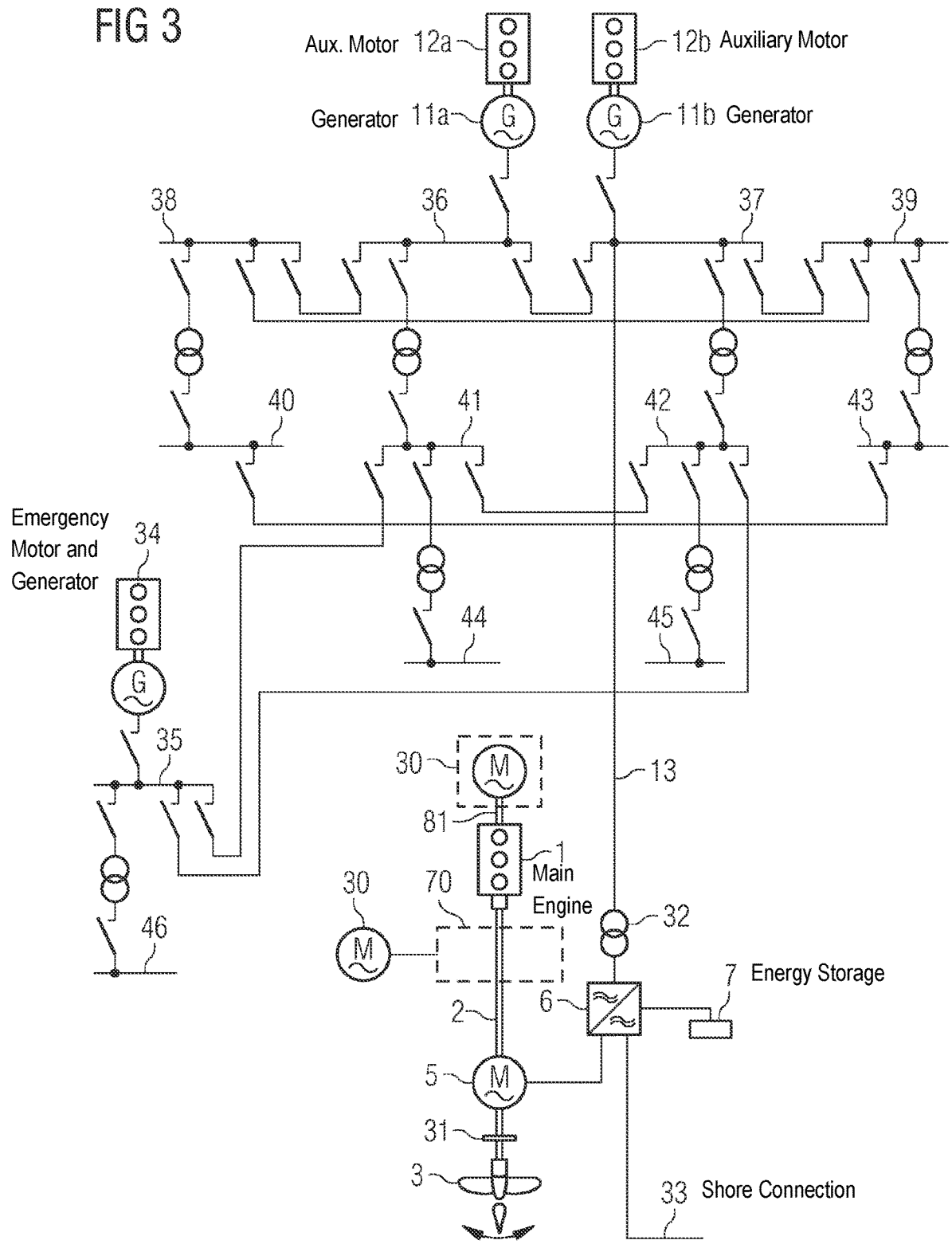
FIG. 3 is a single line diagram for a first embodiment of an energy management system according to the invention, for a single screw vessel.

FIGS. 3 to 6 illustrate a number of embodiments of the invention. In FIG. 3, an example of an energy management system for installation on a new build single screw vessel is illustrated. A prime mover or main engine 1, in this example with a maximum rating of 26 MW may be connected to a shaft 2. The main engine may capable of producing as much as 30 MW, but low to mid 20s MW is typical for a single screw vessel. A motor/generator unit 5, in this example with a rating of 5 MW, may be connected to the shaft 2. For a lower power main engine, the motor/generator unit rating may be suitably reduced. The connection may be made by mounting the motor/generator unit 5 onto the shaft 2 as illustrated, or by directly connecting a motor/generator unit 30 to the main engine 1. Another option is to connect the motor/generator unit 30 via a gearbox 70. Using a gearbox allows the motor/generator unit 30 to run at a much higher rate than the shaft speed, which typically turns quite slowly, for example at only 80 rpm. Although not specifically shown, in each case the motor/generator unit 5, 30 is connected to the frequency converter 6. The examples are given for a shaft mounted motor/generator, but the alternatives may be substituted as required and this description should be read as covering any of the options. A propeller 3 is driven by the shaft. Optionally, this may be via a clutch 31. The location of the clutch allows the propeller to be disengaged whilst the main engine is still producing power which is diverted to consumers 10 or for charging the energy storage unit 7.

Power up to the maximum rating of the motor/generator unit 5, which may be as much as 5.5 MW, more typically 2.5 MW and in this example, 5 MW, may be given to or taken from the shaft through the motor/generator unit 5. In the case of an oversupply of energy to the shaft, energy from the motor/generator unit 5, the AC input to the frequency converter 6 is frequency converted in converter 6 to a suitable frequency for the main switchboard 8. The initial step of rectification to DC puts the input into a suitable form for supplying to the energy storage unit 7, or else, after converting back to AC at the appropriate frequency a transformer 32 transforms the output to a suitable voltage for the main switchboard 8. In the case of an undersupply of energy from the main engine 1, the energy storage system 7 gives up its stored energy to the DC bus in the converter which converts back to AC and augments the main engine in powering the shaft. The converter system may be installed within the shaft tunnel area of the vessel. The motor/generator unit 5, 30 may be shaft mounted onto the propulsion shaft 2, connected by gearing, or mounted directly on the prime mover shaft 81.

When docked, the energy storage system can be charged from a shore connection 33, for example to provide energy for main engine start up, feeding auxiliary consumption, or a back-up during initial manoeuvring. Auxiliary motors 12a, 12b and corresponding generators 11a, 11b connected to the main switchboard may also provide power via transformer 32 and frequency converter 6 to the motor/generator unit 5 in certain operating modes. The auxiliary motors may be dual fuel motors, i.e. able to operate on marine fuel oil, or bio fuel, or liquefied natural gas.

Interconnections between the various switchboards and the transformer 32, or for low voltage switchboards operating at a voltage in accordance with the frequency converter 6, then directly connected, rather than through the transformer, allow for a variety of consumers to be supplied from their switchboards, or for an emergency motor and generator 34 to be connected to an emergency switchboard 35, or to any of the main switchboards 36, 37 or subsidiary switchboards. The subsidiary switchboards operate at different voltages and are connected to other switchboards via transformers to transform up or down accordingly. Cargo switchboards 38, 39 are at the same voltage as the main switchboard, in this example at 6.6 kV, whilst auxiliary switchboards, 40, 41, 42, 43 and emergency switchboard 35 are an order of magnitude lower in voltage, in this example between 690V and 440V. In this example, further auxiliary switchboards 44, 45 and emergency switchboard 46 operate at 230V. Each switchboard is separated from its neighbour by a breaker, to protect against faults. The connection from the motor/generator unit 5 and energy storage system 7 is into the starboard main switchboard in this example and further distributed from there. The particular voltage on each of the different types of switchboard is not limited to the examples given, but may be adapted to the user's requirement.

Figure 4:
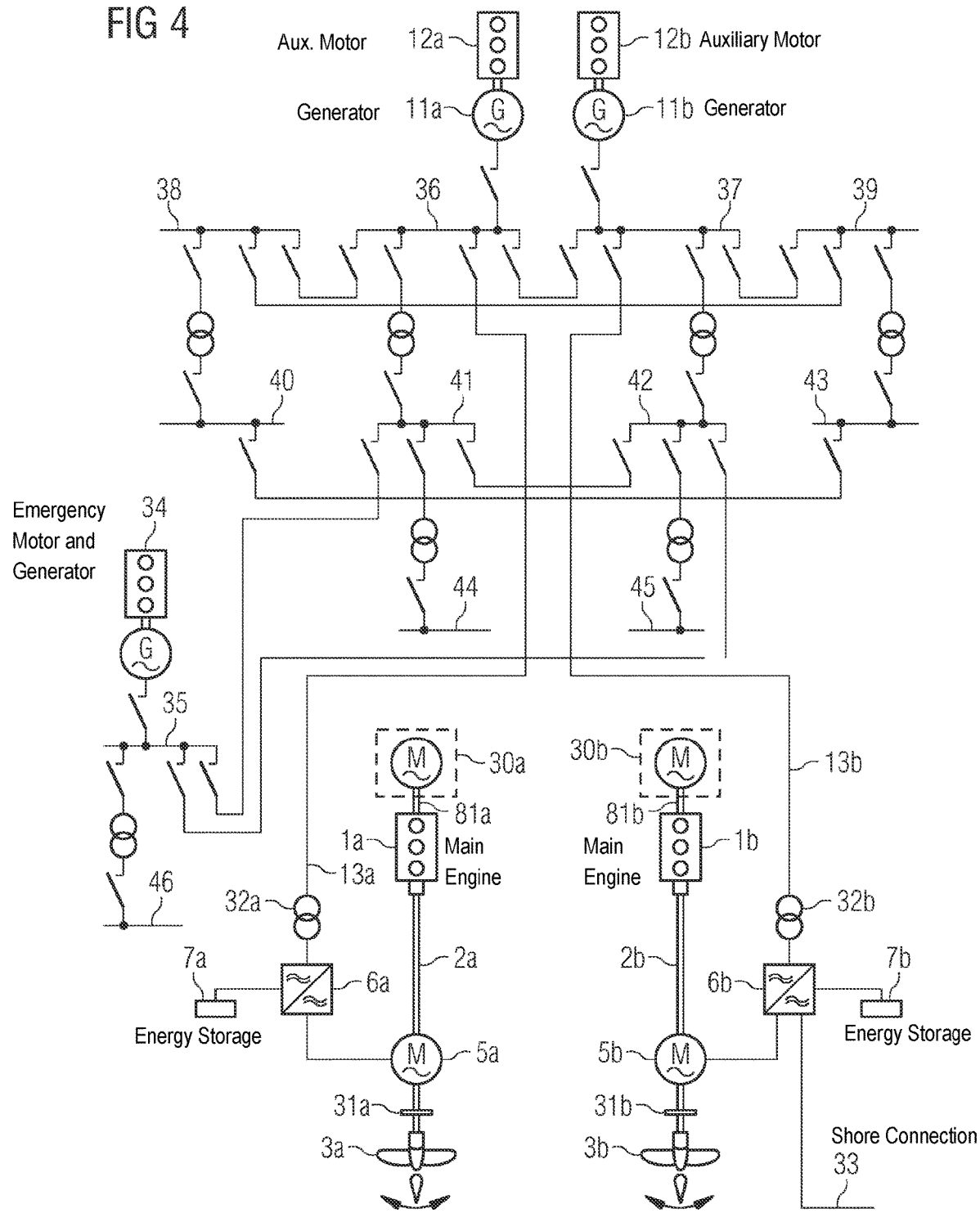
FIG. 4 shows the embodiment of FIG. 3 for a twin screw vessel.

In the example of FIG. 4, also for a new build vessel, the same reference numbers are used as in FIG. 3 where the components and their function are the same and these will not be further described. The FIG. 4 example differs from the FIG. 3 embodiment in that it is for a twin screw vessel. Instead of all power transfer between the main engine and shaft and ship service power or auxiliary consumers being through one main switchboard (in the FIG. 3 example, the starboard main switchboard), each screw has its own prime mover, main engine 1a, 1b and motor/generator unit 5a, 5b on its own shaft 2a, 2b. Typically, a twin screw vessel has two smaller engines, producing a similar amount of power to the single engine of the single screw vessel. In this example, engines 1a, 1b produce 13 MW of power each. This means that a smaller motor/generator unit 5a, 5b can be connected to each shaft. As the prime mover of FIG. 4 is rated at half the power of the prime mover in the single screw example of FIG. 3, so the motor/generator unit 5a, 5b can also be rated for half the power. For this example a 2.5 MW motor/generator unit is provided on each shaft 2a, 2b. The apparent power at the input to each transformer 32a, 32b is reduced by a similar proportion and the transformer transforms to the main switchboard voltage as before. The option of transformerless operation, as mentioned above, with a switchboard that is operating at a voltage which is in accordance with the frequency converter voltage, is also possible for the twin screw vessel. Alternative connections of the motor/generator units 30a, 30b in FIG. 4 are shown direct to the prime mover shaft 81a, 81b. The interconnections and voltages on each of the switchboards are otherwise the same as in the FIG. 3 example.

Figure 5:
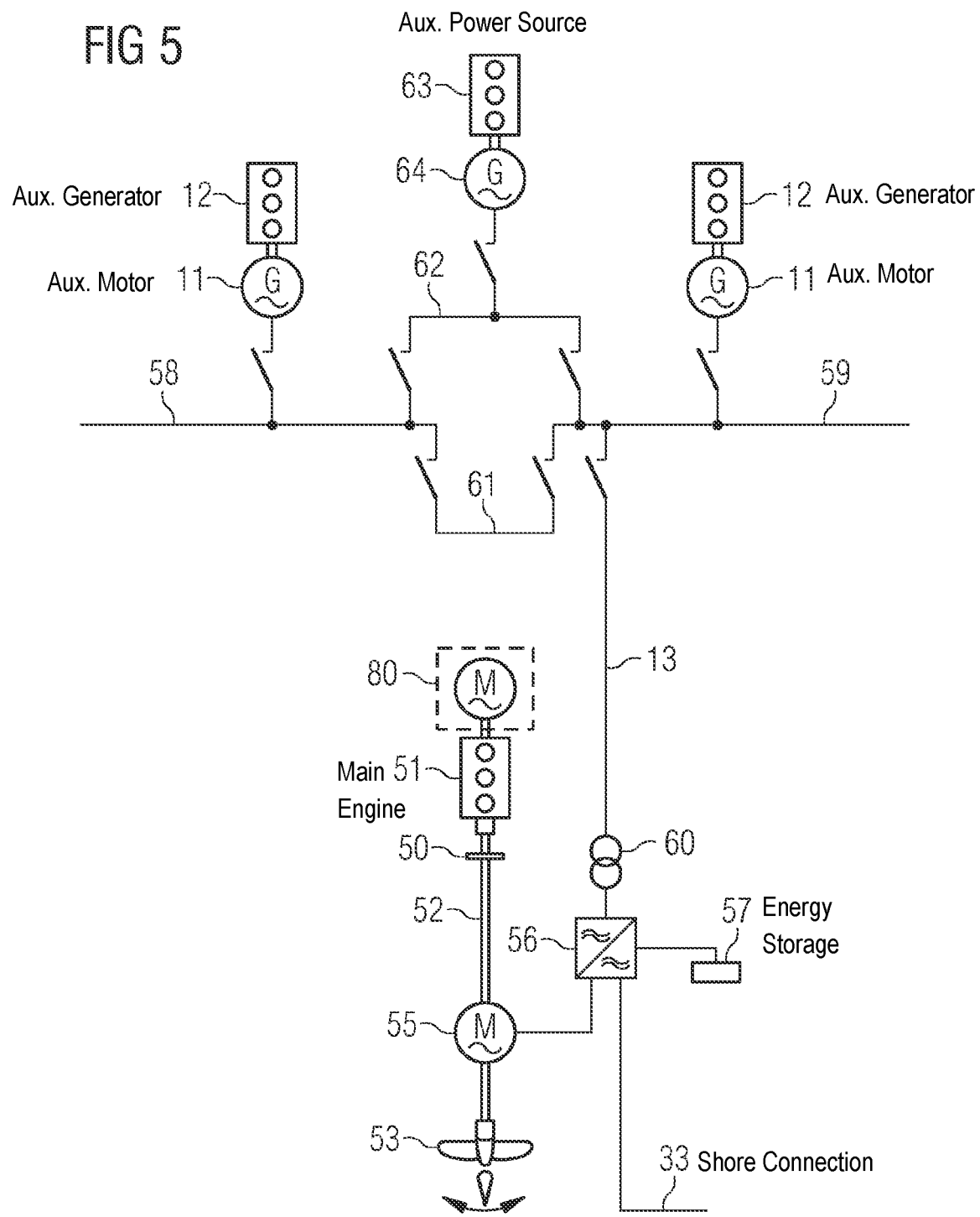
FIG. 5 is a single line diagram for a second embodiment of an energy management system according to the invention.

An alternative example for retrofitting the present invention to a single screw vessel is illustrated in FIG. 5. A prime mover in the form of main engine 51 is connected via clutch 50 to shaft 52. As before, the use of a clutch is optional and could be before or after the motor according to the prime purpose. In this example, if the main engine fails, the clutch means that the shaft can still be run by directing energy from the energy storage unit 7, or auxiliary engines connected to the main switchboard. If the clutch is after the motor/generator unit, then it allows the main engine to act as a generator, without turning the propeller. In theory, a clutch 50 could be installed on the shaft 52 both before and after the motor to allow for either type of operation, but the cost and complexity are then increased. A motor/generator unit 55 is connected to the shaft and a propeller 53 is fitted to the shaft. The motor/generator unit 55 is coupled to a frequency converter 56 and through this to energy storage unit 57. A shore connection 33 may be provided. Excess power from the shaft 52 may be taken off by the motor/generator unit 55, frequency converted in converter 56 and either stored in the energy storage unit 57 or transformed to the main switchboard voltage in transformer 60 and supplied to the main switchboard 58, 59 via connection 13 and the starboard main switchboard 59. In this example, a 22 MW main engine is provided, with a motor/generator unit 55 which is able to take off or take in up to 5.5 MW. The main switchboard is a 3.3 kV switchboard, so the transformer 60 transforms from 690V to 3.3 kV. There are two connections available between the port and starboard switchboards 58, 59, with breakers at either end. A first connection 61, which simply connects the port and starboard switchboard when the breakers are closed and a second connection 62, to which an auxiliary power source, in this example a diesel generator 63, is connected. The auxiliary power source 63 is connected via generator 64 and design to be able to meet the majority of the power requirement of the main switchboard. In addition, each of the port and starboard switchboard may have an auxiliary generator 12 and motor 11 of a similar type to that in the FIGS. 3 and 4 examples, discussed above.

Figure 6:
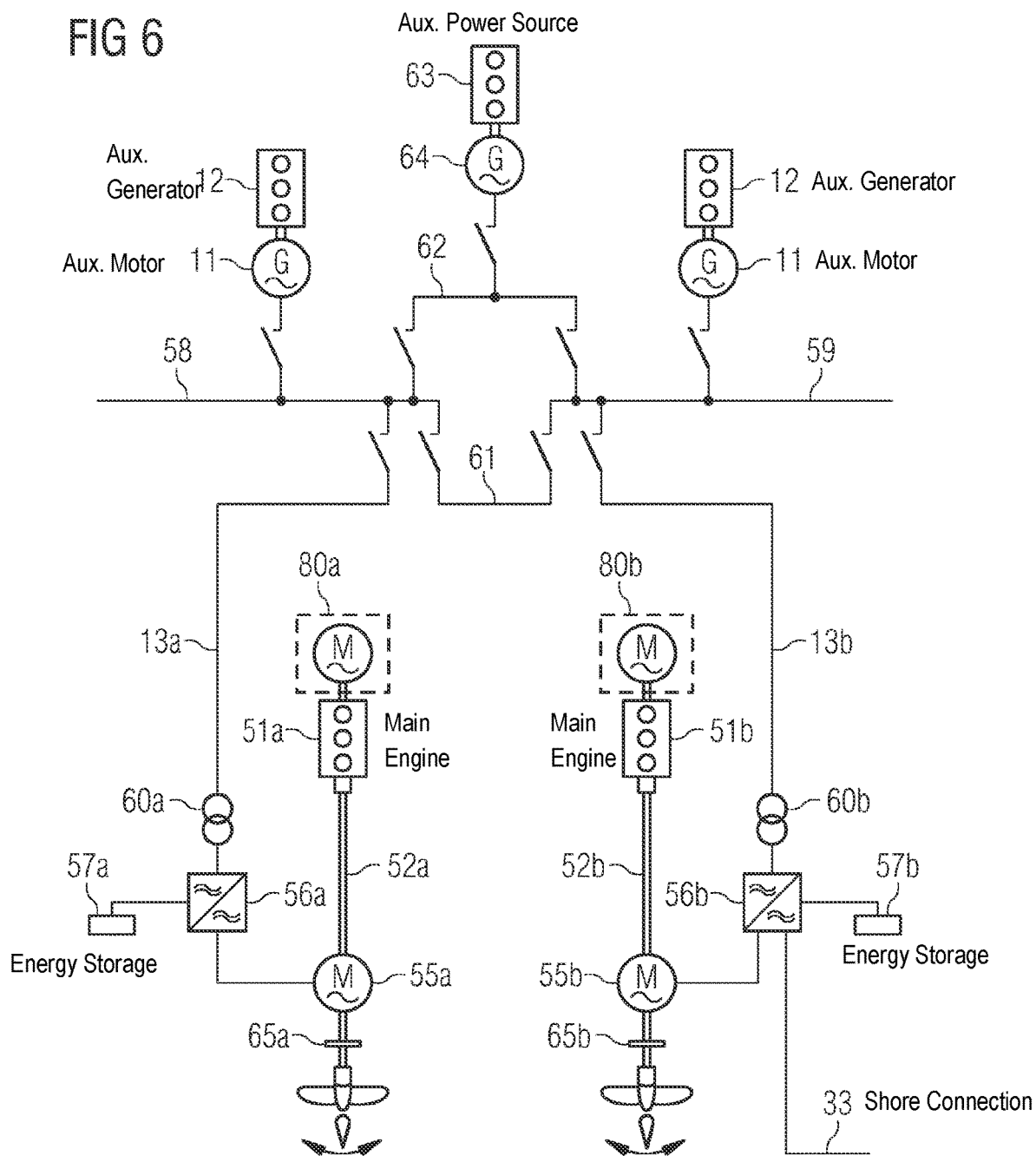
FIG. 6 shows the embodiment of FIG. 5 for a twin screw vessel.

A further example is illustrated in FIG. 6. This is similar to the FIG. 5 example, but for a twin screw vessel. For each screw, a prime mover in the form of main engine 51a, 51b is connected to shaft 52a, 52b. A motor/generator unit 55a, 55b is connected to the shaft and a propeller 53a, 53b is fitted to the shaft, connected via a clutch 65a, 65b. Alternatively, for both the FIG. 5 and FIG. 6 examples, a motor/generator unit 80, 80a, 80b may be directly connected to the main engine 51, 51a, 51b, or the motor generator 55, 55a, 55b, 80, 80a, 80b may be connected via a gearbox. The motor/generator unit 55a, 55b is coupled to a frequency converter 56a, 56b and through this to energy storage unit 57a, 57b. A shore connection 33 may be provided on one side, in this case only for the starboard side screw. Adding a shore connection on both sides is possible, but increases costs. Excess power from the shaft 52a, 52b may be taken off by the motor/generator unit 55a, 55b, frequency converted in converter 56a, 56b and either stored in the energy storage unit 57a, 57b or transformed to the main switchboard voltage in transformer 60a, 60b and supplied to the main switchboard 58, 59. In this example, the power from each side is supplied to the main switchboard 58, 59 on that side, i.e. the port transformer 60a is connected to the port main switchboard 58 via connection 13a and the starboard transformer 60b is connected to the starboard main switchboard 59 via connection 13b. For a similar sized twin screw vessel, as compared with a single screw vessel, each main engine has a lower maximum power. For this example, the power of each engine is 13 MW, with a motor/generator unit 55a, 55b which is able to take off or take in up to 2.5 MW. The main switchboard is a 3.3 kV switchboard, so the transformer 60a, 60b transforms from 690V to 3.3 kV and the interconnections between the port and starboard main switchboards, as well as the auxiliary power sources and generators are the same as in the FIG. 5 example.

The energy management system 4 is able to operate in a number of different modes. In peak shaving mode, the energy storage unit 7 is used to boost energy to the main shaft 2, or to offload energy from the main shaft, to ensure stable operation for the main engine 1 when moving through the sea. In booster mode, when more propulsion power is needed than that which is available from the main engine 1, the motor/generator unit 5 acts as a motor with the required electrical power being generated by the auxiliary engines 12a, 12b supplying the main switchboard. If full power is not used, then booster mode also includes some peak shaving functionality. Alternator mode is used when there is more energy available from the main propulsion then is needed. The energy management system 4 takes off power to feed one or more auxiliary switchboards 40, 41, 42, 43, 44, 45, 46. Again, if full power is not used, then this mode also includes some peak shaving functionality.

Emergency mode is used if the main engine 1 is out of service for some reason. The energy management system 4 uses the auxiliary engines 12a, 12b, 12c to provide power to the energy management system, so that although the vessel has only limited power, it will still have some manoeuvring capability. Also the energy management system 4 may also be used to start the main engine 1 in case of failure of the primary start system 30. An auxiliary feed mode addresses the need for the auxiliary generators 12a, 12b, 63 to be run at high load sometimes. If the auxiliary engines are always run at low load, then they will tend to soot up, be inefficient and cause other problems. For this reason it is desired to load the auxiliary at close to full load. This may lead to overload of power if the load is fluctuating. The energy management system may work as a short term power backup and smoothing device, until new generator sets are brought online if needed. The energy storage unit may also assist in a transient startup sequence for heavy start consumers.

Figure 7:
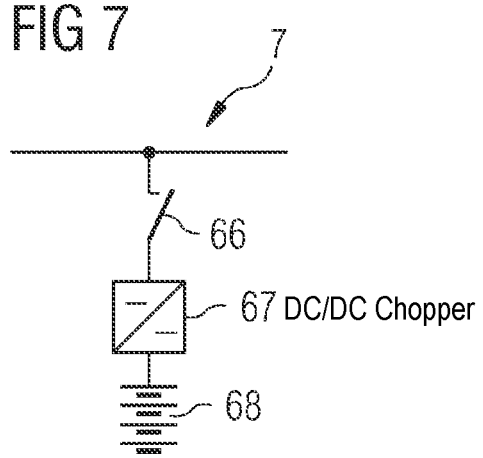
FIG. 7 illustrates more detail of the energy storage system in the embodiments of FIGS. 3 to 6 and, FIG. 8 is a flow diagram illustrating a method according to the present invention for controlling power on a vessel.

FIG. 7 illustrates an example of the energy storage unit in more detail. The energy storage unit 7 may be disconnected from the frequency converter by means of breaker 66. A DC to DC chopper 67 adapts the DC voltage from frequency converter to DC Bus voltage and controls energy storage power flow to prevent overloading or overcharging of the capacitors. The chopper is connected to one or more capacitors, supercapacitors, or ultracapacitors 68 which are able to store and release energy in large amounts and in short timescales and controls the voltage and power flow to and from the capacitors, supercapacitors, or ultracapacitors. The chopper circuit may also be used for controlling chemical energy storage, such as batteries, or flywheel energy storage.

Figure 8:
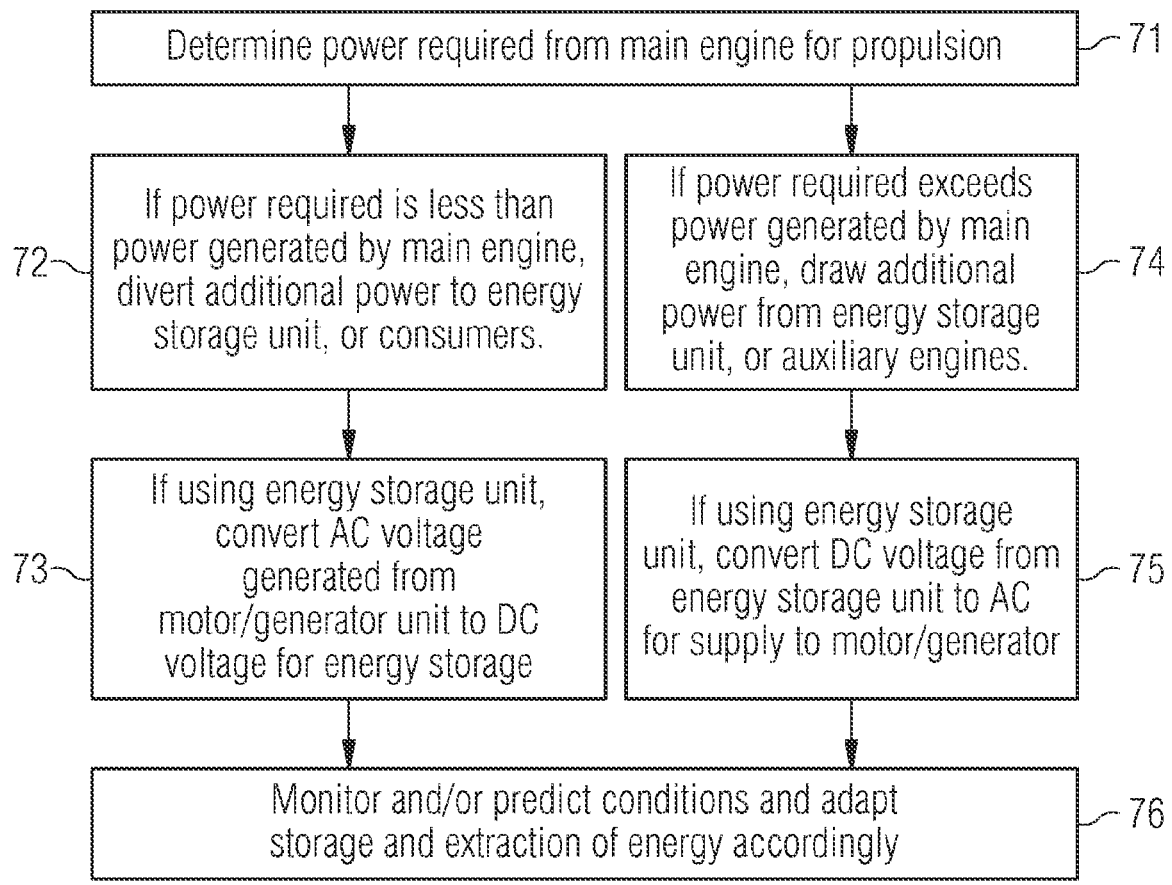

FIG. 8 is a flow diagram of a method of operating a power control system of the present invention. The energy management system 4 and/or the power management system 9 determine 71 the power required from the main engine for propulsion when under way. If the power required for propulsion is less than the power generated by the main engine, additional power is diverted 72 to the energy storage unit 7, or consumers 10. If the energy storage unit is being used, AC voltage generated from the motor/generator unit, whether directly connected to the prime mover shaft, mounted on the propeller shaft, or connected via a gearbox, is converted 73 to DC voltage for the energy storage unit. If the power required for propulsion exceeds the power generated by the main engine, additional power is extracted 74 from the energy storage unit 7, or supplied by auxiliary engines 12a, 12b via the main switchboard. If the energy storage unit is being used, DC voltage from the energy storage unit 7 is converted 75 to AC voltage to supply power to the motor/generator unit and the shaft. The energy and power management systems 4, 9 continue to monitor 76 both predicted wave behaviour and special operating conditions that may occur on board the vessel in order to adapt the storage and extraction of energy accordingly. The operation of the main engine is more efficient if it can be kept generating at a substantially constant rate, which would not necessarily mean running at full power, but generally below. Rather than keep changing the engine power output to cope with peaks and troughs of demand in rough seas, the prime mover generates a steady output, typically chosen to be sufficient to provide the actual average power required and the peaks and trough in demand are handled by the energy storage unit storing energy generated by the prime mover which exceeds the instantaneous required power and supplying energy to the shaft when the instantaneous power demand exceeds the power generated by the prime mover.

Operating the system of the present invention may reduce fuel consumption and emissions; reduce wear and tear on the equipment and so reduce maintenance and down-time, increasing up-time and performance. Optimising the vessel in this way may reduce installed engine power, giving direct and indirect cost savings, as well as reducing weight and space requirements. The interconnections with stored energy and auxiliary power sources improve safety by maintaining propulsion, for at least a short time, in case of the loss of the main engine. The system may be manufactured in a modular fashion and suitable modules chosen over a range of capacities, typically in the range of up to 5 MW of intermittent capacity for between 20 MW and 30 MW of overall capacity. The system is flexible enough to provide a boost in performance of power taken in, for example for a heavy load start and supply that boost in a short time scale, of the order of milliseconds.

The invention claimed is:

1. A vessel energy management system for controlling power supply to and from a propulsion system of a vessel, the vessel energy management system comprising:
    a motor-generator unit adapted to receive power from a prime mover of the vessel;
    a frequency converter;
    an energy storage unit; and
    a controller;
    wherein the energy storage unit comprises one or more capacitors, super capacitors or ultra capacitors, chemical energy storage, batteries, or flywheel energy storage;
    wherein the controller of the vessel energy management system determines an instantaneous power requirement of the propulsion system and an average power generated by the prime mover;
    a comparator to compare the instantaneous power requirement and the average power and provide a result;
    wherein when the instantaneous power requirement exceeds the average power based on the result, the motor-generator unit receives energy from the energy storage unit; and, wherein when the instantaneous power requirement is less than the average power based on the result, the motor-generator unit supplies power from the prime mover to the energy storage unit.

2. The vessel energy management system according to claim 1, further comprising:
    an input from a main switchboard of the vessel,
    wherein when the instantaneous power requirement exceeds the average power based on the result, the motor-generator unit receives energy from an auxiliary generator via the main switchboard, in addition to energy from the prime mover, or the energy storage unit.

3. The vessel energy management system according to claim 1, further comprising:
    an input to a main switchboard of the vessel,
    wherein when the instantaneous power requirement of the propulsion system is less than the average power, the main switchboard receives energy from the prime mover, or energy storage unit, via the vessel energy management system.

4. The vessel energy management system according to claim 1,
    wherein the energy storage unit further comprises a chopper to control a rate of charging and discharging of the capacitors, the super capacitors or the ultra capacitors, or of the chemical energy storage, the batteries, or the flywheel energy storage.

5. The vessel energy management system according to claim 1, further comprising:
    a clutch on a shaft that disconnects the propeller when the prime mover is powering the main switchboard alone.

6. The vessel energy management system according to claim 1, further comprising:
    an estimator for estimating when the motor-generator unit receives energy from the energy storage unit and when the motor-generator unit supplies power from the prime mover to the energy storage unit.

7. The vessel energy management system of claim 6, wherein the estimator comprises a Kalman filter.

8. The vessel energy management system according to claim 1, further comprising:
    an auxiliary generator for supplying power when the prime mover is out of service.

9. A method of vessel energy management for controlling power supply to and from a propulsion system of a vessel, the method comprising:
    receiving power at a motor-generator unit from a prime mover of the vessel;
    determining an instantaneous power requirement of the propulsion system of the vessel;
    determining an average power generated by the prime mover;
    comparing the instantaneous power requirement and the average power and providing a result;
    when the instantaneous power requirement exceeds the average power based on the result, causing the motor-generator unit to receive energy from capacitors, super capacitors, or ultra capacitors, chemical energy storage, batteries, or flywheel energy storage, of an energy storage unit; when the instantaneous power requirement is less than the average power based on the result, causing the motor-generator unit to supply power from the prime mover to the capacitors, the super capacitors, or the ultra capacitors, the chemical energy storage, the batteries, or the flywheel energy storage, of the energy storage unit; and
    monitoring the instantaneous power requirement and the average power in varying sea conditions and adapting accordingly.

10. The method according to claim 9, further comprising:
    receiving power at the motor-generator unit from an auxiliary generator via the main switchboard of the vessel, when the instantaneous power requirement exceeds the average power based on the result.

11. The method according to claim 9, further comprising:
    inputting power from the prime mover to a main switchboard of the vessel, when the instantaneous power requirement is less than the average power based on the result.

12. The method according to claim 11, further comprising:
    disconnecting a propeller of the propulsion system and supplying all power from the prime mover to the main switchboard of the vessel.

13. The method according to claim 9, further comprising:
    estimating when the motor-generator unit is to receive energy from the energy storage unit and when the motor-generator unit is to supply power from the prime mover to the energy storage unit.

14. The method according to claim 13, wherein the step of estimating is done with an estimator comprising a Kalman filter.

15. A vessel energy management system for controlling power supply to and from a propulsion system of a vessel, the vessel energy management system comprising:
    a prime mover supplying power to a shaft;
    a motor-generator unit adapted to receive power from the shaft;
    an energy storage unit;

a frequency converter for converting energy from the motor-generator unit for supply to consumers or for supply to the energy storage unit;

a controller;

wherein the energy storage unit comprises one or more capacitors, super capacitors or ultra capacitors, chemical energy storage, batteries, or flywheel energy storage;

wherein the controller determines an instantaneous power requirement of the propulsion system and an average power generated by the prime mover;

an estimator for estimating when to take power from the shaft and when to supply power to the shaft;

a comparator to compare the instantaneous power requirement and the average power and provide a result;

wherein when the instantaneous power requirement exceeds the average power based on the result, the motor-generator unit receives energy from the energy storage unit or from an auxiliary generator to augment power supplied by the prime mover, wherein a timing of when to supply energy to the motor-generator unit is determined by the estimator; and wherein when the instantaneous power requirement is less than the average power based on the result, the motor-generator unit supplies power from the prime mover to the energy storage unit or to consumers, wherein a timing of when to supply power to the energy storage unit or to consumers is determined by the estimator.

* * * * *